(12) United States Patent
Barger et al.

(10) Patent No.: US 10,012,315 B2
(45) Date of Patent: Jul. 3, 2018

(54) SEAL ASSEMBLY

(71) Applicant: UNITED TECHNOLOGIES CORPORATION, Farmington, CT (US)

(72) Inventors: David M. Barger, East Hartford, CT (US); Adam G. Smedresman, Larchmont, NY (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 66 days.

(21) Appl. No.: 15/162,204

(22) Filed: May 23, 2016

(65) Prior Publication Data

US 2017/0335971 A1   Nov. 23, 2017

(51) Int. Cl.
  *F16C 33/78*  (2006.01)
  *F16J 15/34*  (2006.01)
  *F01D 25/16*  (2006.01)

(52) U.S. Cl.
  CPC ........ *F16J 15/3452* (2013.01); *F01D 25/162* (2013.01); *F16C 33/7826* (2013.01); *F16J 15/3464* (2013.01); *F05D 2220/32* (2013.01); *F05D 2240/54* (2013.01); *F05D 2240/55* (2013.01); *F16C 2360/23* (2013.01)

(58) Field of Classification Search
  CPC ............... F16C 33/7826; F16C 2360/23; F16J 15/3452; F16J 15/3464; F01D 25/162; F05D 2220/32; F05D 2240/54; F05D 2240/55
  See application file for complete search history.

(56) References Cited

U.S. PATENT DOCUMENTS

| 4,477,088 A * | 10/1984 | Picard ................... F16J 15/008 277/379 |
| 4,687,346 A * | 8/1987 | Suciu .................... F01D 25/164 277/385 |
| 5,692,756 A * | 12/1997 | Altieri ................. F16J 15/3464 277/353 |
| 6,142,729 A * | 11/2000 | Tran ..................... F01D 11/003 415/113 |
| 7,837,199 B2 | 11/2010 | Craig et al. |
| 8,109,717 B2 * | 2/2012 | Glahn ...................... F02C 7/28 415/174.2 |
| 8,714,558 B2 * | 5/2014 | Berard .................. F16J 15/366 277/358 |

(Continued)

FOREIGN PATENT DOCUMENTS

| EP | 0112268 | 6/1984 |
| EP | 2853788 | 4/2015 |

(Continued)

OTHER PUBLICATIONS

EP Search report dated Nov. 7, 2017 in EP Application No. 17172567.4.

*Primary Examiner* — Thomas R Hannon
(74) *Attorney, Agent, or Firm* — Snell & Wilmer L.L.P.

(57) ABSTRACT

A seal assembly is disclosed. A seal assembly may comprise a seal carrier, a compliant structure comprising a first end and a second end, wherein the first end is coupled to the seal carrier, and/or a support structure coupled to the second end. The seal carrier may be integral with the compliant structure.

19 Claims, 4 Drawing Sheets

(56) References Cited

U.S. PATENT DOCUMENTS

| | | | |
|---|---|---|---|
| 9,163,522 B2 | 10/2015 | Davis et al. | |
| 9,416,820 B2 * | 8/2016 | Ertas | F16C 32/0662 |
| 2007/0241511 A1 | 10/2007 | Kim | |
| 2014/0054862 A1 | 2/2014 | Davis et al. | |
| 2014/0062026 A1 | 3/2014 | Davis et al. | |
| 2014/0300058 A1 | 10/2014 | Brunet | |
| 2015/0233293 A1 * | 8/2015 | Grogg | F02C 7/06 |
| | | | 248/562 |

FOREIGN PATENT DOCUMENTS

| | | |
|---|---|---|
| EP | 2857722 | 4/2015 |
| WO | 9953227 | 10/1999 |

* cited by examiner

SEAL ASSEMBLY

FIELD

The present disclosure relates to seal assemblies, and more specifically, to seal assemblies within bearing compartments.

BACKGROUND

Bearing compartments are cavities within machinery which comprise one or more bearing assemblies, and may at least partially contain one or more fluids such as oil, air, and the like. The fluid at least partially contained in the bearing compartment may function to provide lubrication and/or cooling for the bearing assembly during operation. Seal assemblies within bearing compartments act to enclose the bearing compartment to keep the fluid within the bearing compartment during, for example, engine operation. However, within a seal assembly, there may be multiple components, and fluid leaks may occur between the components of a seal assembly. Fluid leaks may lead to undesirable consequences, such as starving the bearing of lubricant, coking, fire, etc.

SUMMARY

In various embodiments, a seal assembly may comprise a seal carrier, a compliant structure comprising a first end coupled to the seal carrier and a second end, and/or a support structure coupled to the second end. The compliant structure may be integral with the seal carrier and/or the compliant structure. In various embodiments, the compliant structure may be integral with the seal carrier and the compliant structure. The seal carrier, compliant structure, and/or support structure may comprise a steel alloy and/or a titanium alloy. The compliant structure may comprise a flexible member. In various embodiments, the compliant structure may be a bellows spring. In various embodiments, the compliant structure may comprise a V-shape. In various embodiments, the seal assembly may comprise a knife edge seal coupled to a second support arm of the support structure. In various embodiments, the seal assembly may comprise a seal coupled to first carrier contact surface of the seal carrier. In various embodiments, the seal assembly may comprise a seal plate disposed adjacent to a nose of the seal, wherein the compliant structure applies a mechanical load to the seal to press the seal against the seal plate. In various embodiments, the seal may comprise carbon.

In various embodiments, a bearing compartment may comprise a bearing assembly and a seal assembly. The bearing assembly may comprise a bearing ring and a rotational member coupled to the bearing ring. The seal assembly may comprise a seal carrier, a compliant structure comprising a first end coupled to the seal carrier and a second end, and/or a support structure coupled to the second end, wherein at least one of the seal carrier or the support structure is integral with the compliant structure. In various embodiments, the support structure and the seal carrier may be integral with the compliant structure. In various embodiments, the seal carrier, the compliant structure, and/or the support structure may comprise a steel alloy. In various embodiments, the seal carrier, the compliant structure, and/or the support structure may comprise a titanium alloy. In various embodiments, the compliant structure may be a bellows spring.

In various embodiments, a gas turbine engine may comprise a bearing compartment comprising a bearing assembly and a seal assembly. The bearing assembly may comprise a bearing ring and a rotational member coupled to the bearing ring. The seal assembly may comprise a seal plate coupled to the bearing ring, a seal disposed adjacent to the seal plate, a seal carrier coupled to the seal, a compliant structure coupled to the seal carrier, and/or a support structure coupled to the compliant structure. The seal carrier and/or the support structure may be integral with the compliant structure. In various embodiments, the support structure and the seal carrier may be integral with the compliant structure. The compliant structure may comprise a flexible member. In various embodiments, the compliant structure may be a bellows spring.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
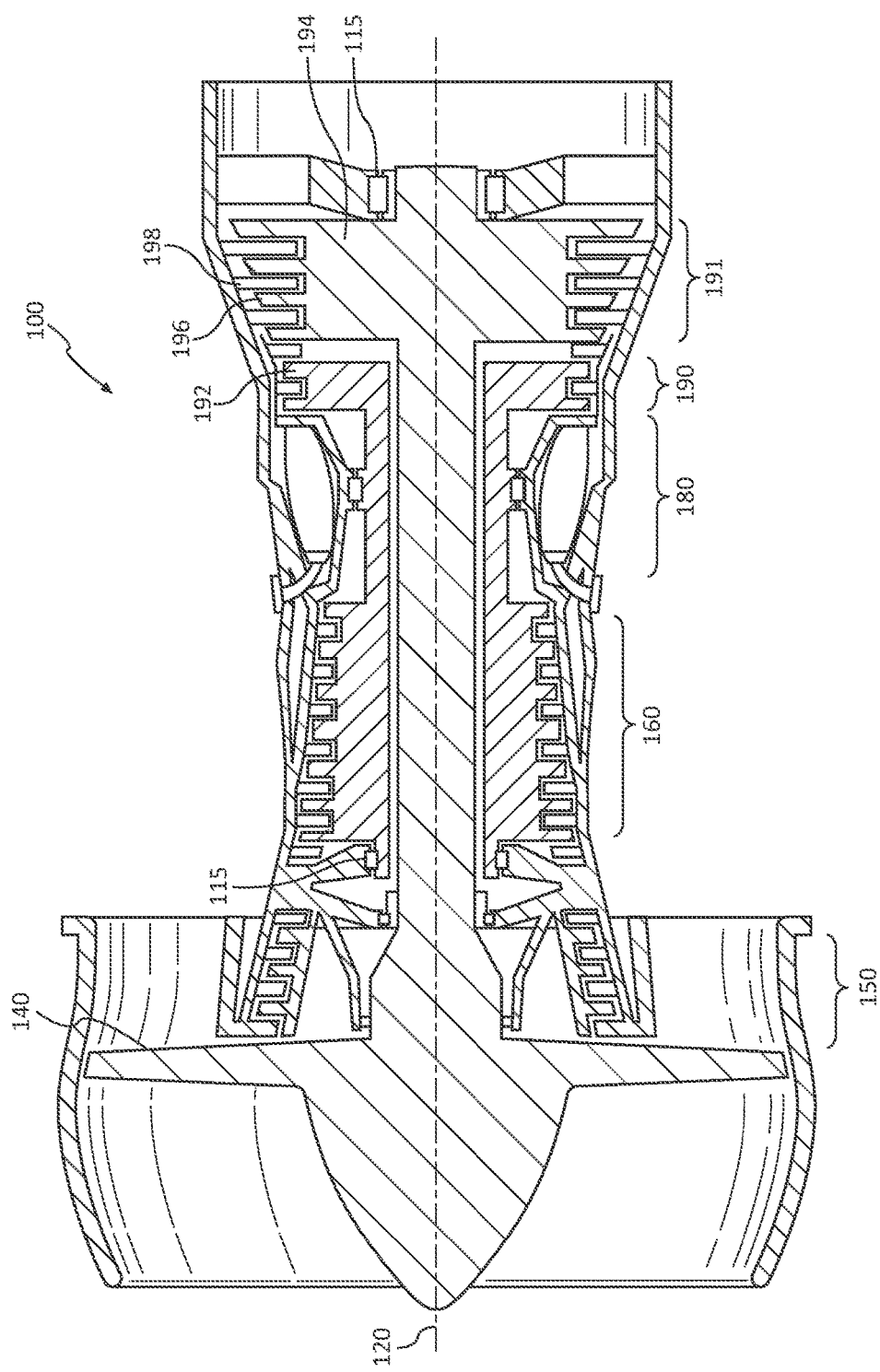
FIG. 1 illustrates a schematic cross-section view of a gas turbine engine, in accordance with various embodiments.

Referring to FIG. 1, a gas turbine engine 100 (such as a turbofan gas turbine engine) is illustrated according to various embodiments. Gas turbine engine 100 is disposed about axis of rotation 120, which spans axially along gas turbine engine 100. Gas turbine engine 100 may comprise a fan 140, compressor sections 150 and 160, a combustion section 180, and turbine sections 190, 191. Air compressed in compressor sections 150, 160 may be mixed with fuel and burned in combustion section 180 and expanded across turbine sections 190, 191. Turbine sections 190, 191 may include high pressure rotors 192 and low pressure rotors 194, which rotate in response to the expansion. Turbine sections 190, 191 may comprise alternating rows of rotary airfoils or blades 196 and static airfoils or vanes 198. A plurality of bearings 115 may support spools in gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
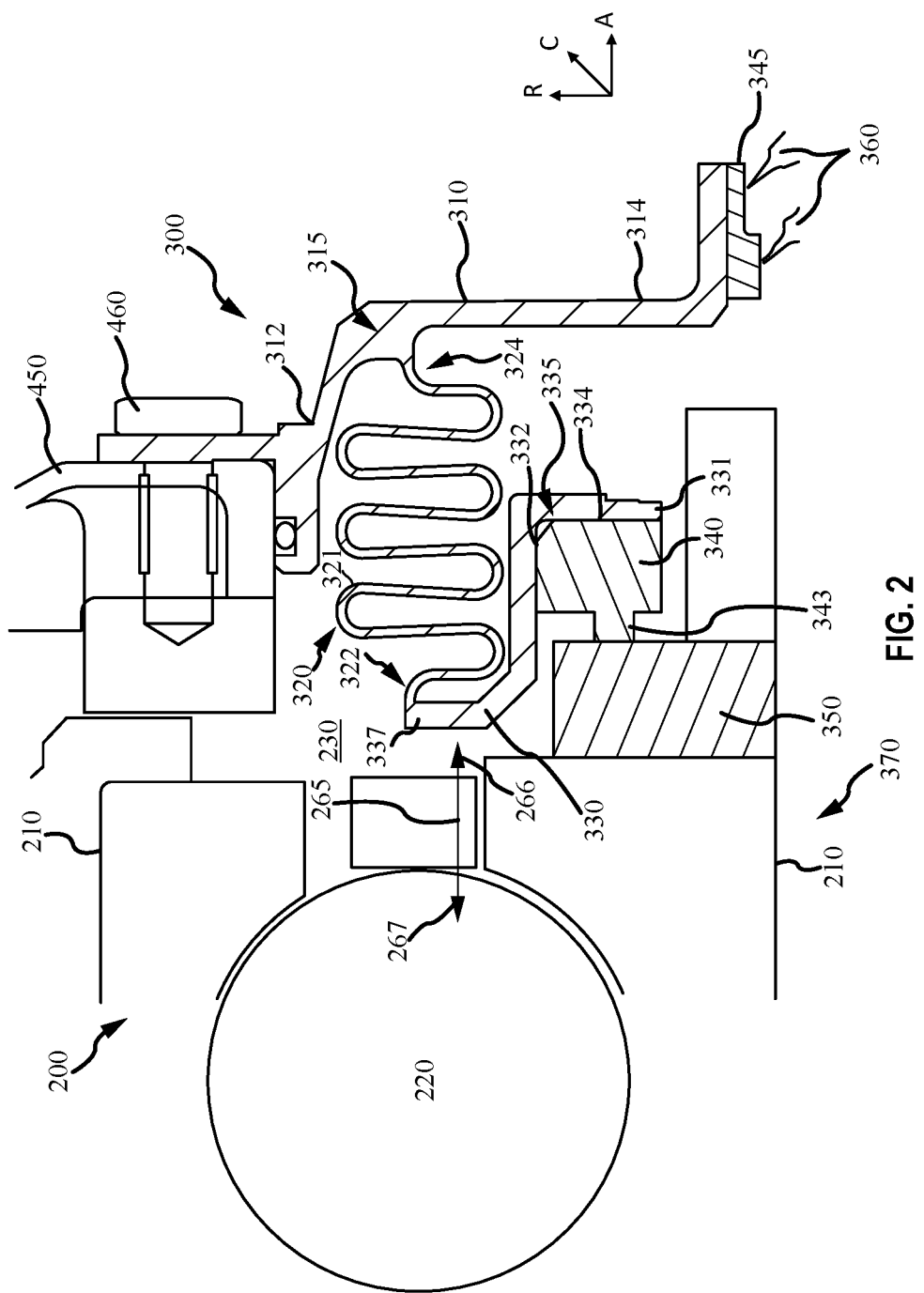
FIGS. 2, 3, and 4 illustrate cross-sectional views of bearing compartments comprising seal assemblies, in accordance with various embodiments.
Figure 3:
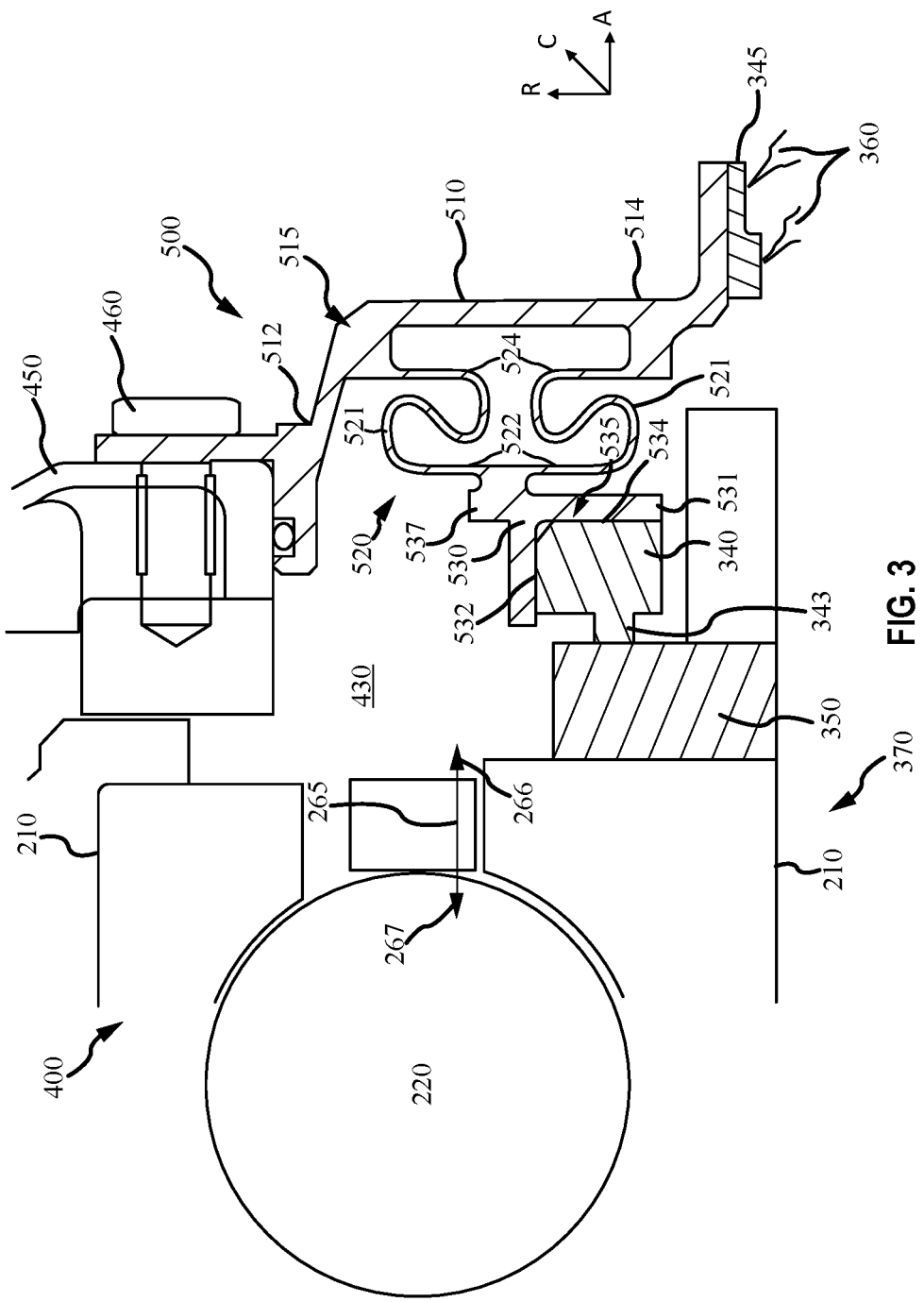
Figure 4:
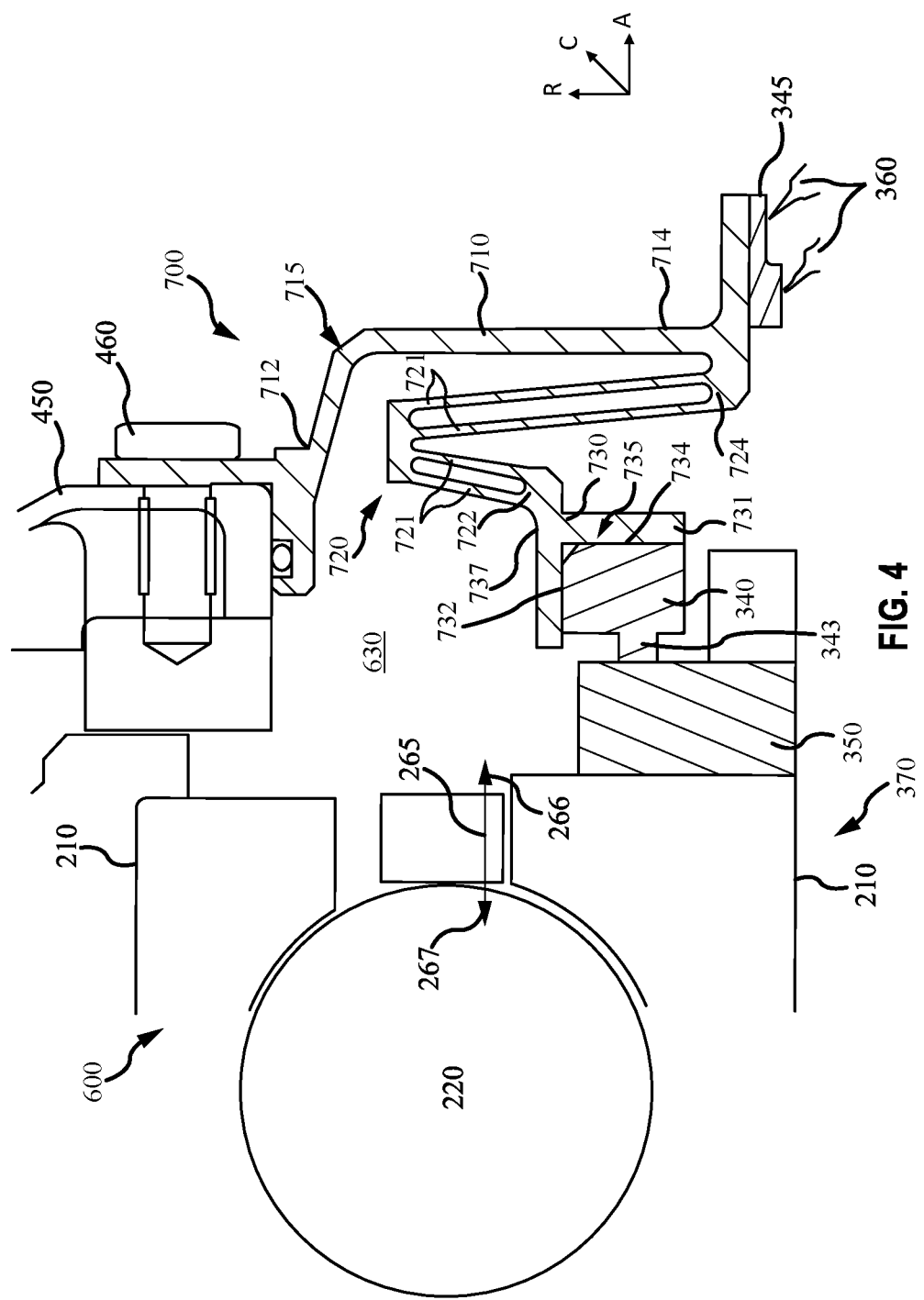

According to various embodiments, FIGS. 2, 3, and 4 depict cross-sectional views of bearing compartments 230, 430, and 630, respectively, comprising bearing assemblies 200, 400, and 600, respectively. Bearing 115 as depicted in FIG. 1, may comprise any one of bearing assembly 200, 400, and/or 600. An A-R-C axis has been included in the drawings to illustrate the axial (A), radial (R) and circumferential (C) directions. For clarity, axial axis A spans parallel to axis of rotation 120, depicted in FIG. 1, where axis of rotation 120 is most proximate to inner radial side 370 of bearing assembly 200, 400, and/or 600, as depicted in FIGS. 2, 3, and 4, respectively. Inner radial side 370 is the radially inner-most portion of bearing assembly 200, 400, and/or 600. Bearing assembly 200, 400, and/or 600 may be a thrust bearing in a gas turbine engine. In various embodiments, the bearing assembly may comprise a bearing ring 210 and a rotational member 220. Rotational member 220 may be a ball in a ball bearing, a roller in a roller bearing, and/or any other suitable type of rotational member. In order to lubricate and/or cool a bearing assembly, such as bearing assembly 200, 400, and/or 600, fluid may be passed within a bearing compartment, such as bearing compartment 230, 430, and/or 630, and throughout the bearing assembly within the bearing compartment. The fluid may be a liquid, such as oil, air, or any other suitable liquid or gas.

Referring to FIG. 2, in various embodiments, bearing compartment 230 may comprise bearing assembly 200 and/or a seal assembly 300. Seal assembly 300 may be configured to prevent fluid leakage from a bearing compartment, such as bearing compartment 230. Seal assembly 300 may comprise a support structure 310, a compliant structure 320, a seal carrier 330, a seal 340, and/or a seal plate 350. In various embodiments, seal plate 350 may be coupled and/or disposed axially adjacent to bearing ring 210, and rotate about axis of rotation 120 (as depicted in FIG. 1) during gas turbine engine operation. Seal 340 may be disposed axially adjacent to seal plate 350, such that seal 340 is coupled to seal plate 350. Seal 340 may remain stationary relative to axis of rotation 120 (as depicted in FIG. 1) during gas turbine engine operation. Seal 340 may comprise a nose 343, which may be disposed adjacent to seal plate 350. Seal 340 and/or nose 343 may contact seal plate 350 during gas turbine engine operation such that no fluid within bearing compartment 230 may leak between seal 340 and seal plate 350. In various embodiments, seal 340 may comprise carbon and/or any other suitable material.

In various embodiments, seal carrier 330 may be coupled to seal 340. Seal carrier 330 may comprise a first carrier contact surface 332 and/or a second carrier contact surface 334 proximate to a carrier first end 331. First carrier contact surface 332 and/or second carrier contact surface 334 may form a seal pocket 335. Seal 340 may be disposed in seal pocket 335 and/or coupled to first carrier contact surface 332 and/or second carrier contact surface 334. A carrier second end 337 of seal carrier 330 may be coupled to compliant structure 320. In various embodiments, seal carrier 330 and compliant structure 320 may be integral. That is, seal carrier 330 and compliant structure 320 may be formed so that there are no physical splits in material between them. In various embodiments, seal carrier 330 and compliant structure 320 may be monolithic. That is, seal carrier 330 and compliant structure 320 may comprise the same material and may be formed from a single piece of material such that there are no physical splits in material between them.

In various embodiments, compliant structure 320 may be disposed radially outward of seal 340 and a portion of seal carrier 330 relative to inner radial side 370, with a portion of seal carrier 330 disposed radially between compliant structure 320 and seal 340. Compliant structure 320 may comprise a first end 322 and a second end 324. First end 322 may be coupled to carrier second end 337. As depicted in FIG. 2, in accordance with various embodiments, compliant structure 320 may be a bellows spring.

A compliant structure, such as compliant structure 320 in seal assembly 300, may be any flexible structure that applies a mechanical load, which may be a compression or tension force, against the seal carrier, such as seal carrier 330. The compliant structure, such as compliant structure 320, may comprise one or more flexible members, such as flexible member 321, that are biased in direction 267 and apply the mechanical load to the seal carrier. The mechanical load, which may be a tension or compression force, applied by the compliant structure on the seal carrier causes a force on the seal, such as seal 340, causing the seal to stay in contact with the seal plate, such as seal plate 350, such that a seal is formed to resist fluid leakage from the bearing compartment, such as bearing compartment 230. In various embodiments, compliant structure 320 may comprise one wave-shaped flexible member 321.

With reference to FIG. 2, during gas turbine engine operation, because of the moving components within the engine and conditions under which the engine may operate, bearing ring 210, rotational member 220, and/or seal plate 350 may translate axially, that is parallel to and/or along axis 265, or radially. In response to bearing ring 210, rotational member 220, and/or seal plate 350 translating axially or radially, seal 340 may translate axially or radially, and as a result, seal carrier 330 may translate axially or radially. Such translations may take place in direction 266 and/or direction 267, or in a radial direction. Compliant structure 320 may be biased in a direction opposite of direction 266, such as direction 267. The bias of compliant structure 320 may apply a load to seal carrier 330 and/or seal 340 in direction 267 such that seal 340 tends to stay in contact with seal plate 350 during such translations such that a seal is formed, which resists fluid leakage from bearing compartment 230. The bias of compliant structure 320 applying a mechanical load in direction 267 counteracts translations by bearing ring 210, rotational member 220, and/or seal plate 350, so that the mechanical load is continually applied to seal 340 to keep seal 340 in contact with seal plate 350. For example, in response to bearing ring 210, rotational member 220, and/or seal plate 350 translating in direction 267, compliant structure 320 may relax to counteract the translation while continuing to apply force against seal 340 and seal plate 350 to maintain the seal between the two components. As a further example, in response to bearing ring 210, rotational member 220, and/or seal plate 350 translating in direction 266, compliant structure 320 may compress to counteract the translation while continuing to apply force against seal 340 and seal plate 350 to maintain the seal between the two components.

In various embodiments, the force or mechanical load applied by compliant structure 320 to counteract translations by bearing ring 210, rotational member 220, and/or seal plate 350 during gas turbine engine operation may be non-linear in magnitude, and generally in direction 267. Compliant structure 320 may be biased to apply the non-linear force to counteract such translations by the other components so as to keep seal 340 in contact with seal plate 350.

In various embodiments, second end 324 of compliant structure 320 may be coupled to support structure 310. Compliant structure 320 may span axially between seal carrier 330 and support structure 310. Support structure 310 may comprise a first support arm 312 and/or a second support arm 314, which may converge at a support intersection 315. Second end 324 of compliant structure 320 may couple to support structure 310 at support intersection 315 or proximate to support intersection 315. In various embodiments, second end 324 of compliant structure 320 may couple to support structure 310 at any suitable location on support structure 310. In various embodiments, compliant structure 320 and support structure 310 may be integral. That is, support structure 310 and compliant structure 320 may be formed so that there are no physical splits in material between them. In various embodiments, support structure 310 and compliant structure 320 may be monolithic. That is, support structure 310 and compliant structure 320 may comprise the same material and may be formed from a single piece of material such that there are no physical splits in material between them.

Compliant structure 320 being integral and/or monolithic with seal carrier 330 and/or support structure 310 may allow a more precise tuning of compliant structure 320 to apply a desired force to seal 340 to create a seal between seal 340 and seal plate 350. With more precise tuning of compliant structure 320, a more precise and desirable pressure and coning of seal 340 against seal plate 350 may be achieved to counteract axial and/or radial translations of bearing ring 210, rotational member 220, and/or seal plate 350. A more precise axial force by compliant structure 320 may improve the wear rate of seal 340 relative to traditional seal assemblies because seal 340 may only be pressed against seal plate 350 as much as necessary.

In various embodiments, first support arm 312 of support structure 310 may be coupled to a structure 450 within the gas turbine engine. First support arm 312 may be coupled to structure 450 in any suitable manner, such as by a bolt 460. Second support arm 314 may be most radially inward portion of support structure 310. In various embodiments, second support arm 314 may be coupled to a knife edge seal 345. Knife edge seal 345 may be stationary during gas turbine engine operation, and may be in contact with knife edges 360, which rotate about axis of rotation 120 (depicted in FIG. 1) during gas turbine engine operation. Knife edge seal 345 may provide a seal against knife edges 360 such that no fluid may pass between knife edge seal 345 and knife edges 360.

In various embodiments, seal carrier 330, compliant structure 320, and/or support structure 310 may be integral and/or monolithic. That is, seal carrier, compliant structure, and/or support structure may be formed so that there are no physical splits in material between them, and/or may comprise the same material. In various embodiments, seal carrier 330, compliant structure 320, and/or support structure 310 may comprise a steel alloy, a titanium alloy, and/or any other suitable material. In various embodiments the titanium alloy may comprise, by weight, 5.5-6.75 percent aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium, commonly known by the industry standard designation of Titanium 6Al-4V, and hereinafter referred to as "Titanium 6Al-4V." In various embodiments, seal carrier 330, compliant structure 320, and/or support structure 310 each may be comprised of any suitable material, which may be different materials, but still may be integral with one another. That is, though seal carrier 330, compliant structure 320, and/or support structure 310 may be comprised of different materials, there may be no physical splits between seal carrier 330, compliant structure 320, and/or support structure 310. For example, seal carrier 330 and/or support structure 310 may comprise a titanium alloy, such Titanium 6Al-4V, and compliant structure 320 may comprise a steel alloy. In various embodiments, seal carrier 330, compliant structure 320, and/or support structure 310 may each comprise a titanium alloy, which may be different titanium alloys between seal carrier 330, compliant structure 320, and/or support structure 310.

With seal carrier 330 and/or support structure 310 being integral and/or monolithic with compliant structure 320, seal assembly 300 and/or bearing compartment 230 may comprise fewer leak paths, through which fluid within bearing compartment 230 may escape, than traditional bearing compartment and/or seal assembly designs. Fewer leak paths in the bearing compartment may result in fewer safety risks associated with potential fluid leaks and better gas turbine engine operation and efficiency. Additionally, seal carrier 330, compliant structure 320, and/or support structure 310 being integral and/or monolithic may reduce manufacturing and assembly costs because seal assembly 300 comprises less separate components than traditional seal assemblies.

Referring to FIG. 3, in various embodiments, bearing compartment 430 may comprise a bearing assembly 400 and/or a seal assembly 500. Elements with the like element numbering as depicted in FIG. 2, are intended to be the same and will not be repeated for the sake of clarity. Seal assembly 500 may be configured to prevent fluid leakage from the bearing compartment, such as bearing compartment 430. Seal assembly 500 may comprise a support structure 510, a compliant structure 520, a seal carrier 530, a seal 340, and/or a seal plate 350. Seal 340 and/or nose 343 may contact seal plate 350 during gas turbine engine operation such that no fluid within bearing compartment 430 may leak between seal 340 and seal plate 350.

In various embodiments, seal carrier 530 may be coupled to seal 340. Seal carrier 530 may comprise a first carrier contact surface 532 and/or a second carrier contact surface 534 proximate to a carrier first end 531. First carrier contact surface 532 and/or second carrier contact surface 534 may form a seal pocket 535. Seal 340 may be disposed in seal pocket 535 and/or coupled to first carrier contact surface 532 and/or second carrier contact surface 534. A carrier second end 537 of seal carrier 530 may be coupled to compliant structure 520. In various embodiments, seal carrier 530 and compliant structure 520 may be integral. That is, seal carrier 530 and compliant structure 520 may be formed so that there are no physical splits in material between them. In various embodiments, seal carrier 530 and compliant structure 520 may be monolithic. That is, seal carrier 530 and compliant structure 520 may comprise the same material and may be formed from a single piece of material such that there are no physical splits in material between them.

In various embodiments, compliant structure 520 may be disposed axially aft of seal 340 and seal carrier 530. Compliant structure 520 may comprise first ends 522 and second ends 524. First ends 522 may be coupled to carrier second end 537.

Compliant structure 520 may comprise one or more flexible member 521 that are biased in direction 267 and apply the mechanical load to seal carrier 530. The mechanical load applied by compliant structure 520 on seal carrier 530 may cause seal 340 to stay in contact with seal plate 350 such that a seal is formed to resist fluid leakage from bearing compartment 430. In various embodiments, compliant structure 520 may comprise two curved flexible members 521.

During gas turbine engine operation, because of the moving components within the engine and conditions under which the engine may operate, bearing ring 210, rotational member 220, and/or seal plate 350 may translate axially, that is, parallel to and/or along axis 265, or radially. In response to bearing ring 210, rotational member 220, and/or seal plate 350 translating axially or radially, seal 340 may translate axially or radially, and as a result, seal carrier 530 may translate axially or radially. Such translations may take place in direction 266 and/or direction 267, or in a radial direction. Compliant structure 520 may be biased in a direction opposite of direction 266, such as direction 267. The bias of compliant structure 520 may apply a load to seal carrier 530 and/or seal 340 in direction 267 such that seal 340 tends to stay in contact with seal plate 350 during such translations such that a seal is formed, which resists fluid leakage from bearing compartment 430. The bias of compliant structure 520 applying a mechanical load in direction 267 counteracts translations by bearing ring 210, rotational member 220, and/or seal plate 350, so that the mechanical load is continually applied to seal 340 to keep seal 340 in contact with seal plate 350. For example, in response to bearing ring 210, rotational member 220, and/or seal plate 350 translating in direction 267, compliant structure 520 may relax to counteract the translation while continuing to apply force against seal 340 and seal plate 350 to maintain the seal between the two components. As a further example, in response to bearing ring 210, rotational member 220, and/or seal plate 350 translating in direction 266, compliant structure 520 may compress to counteract the translation while continuing to apply force against seal 340 and seal plate 350 to maintain the seal between the two components.

In various embodiments, the force or mechanical load applied by compliant structure 520 to counteract translations by bearing ring 210, rotational member 220, and/or seal plate 350 during gas turbine engine operation may be non-linear in magnitude, and generally in direction 267. Compliant structure 520 may be biased to apply the non-linear force to counteract such translations by the other components so as to keep seal 340 in contact with seal plate 350.

In various embodiments, second ends 524 of compliant structure 520 may be coupled to support structure 510. Compliant structure 520 may span axially between seal carrier 530 and support structure 510. Support structure 510 may comprise a first support arm 512 and/or a second support arm 514, which may converge at a support intersection 515. Second ends 524 of compliant structure 520 may couple to support structure 510 at support intersection 515 or proximate to support intersection 515. In various embodiments, second ends 524 of compliant structure 520 may couple to support structure 510 at any suitable location on support structure 510. In various embodiments, compliant structure 520 and support structure 510 may be integral. That is, support structure 510 and compliant structure 520 may be formed so that there are no physical splits in material between them. In various embodiments, support structure 510 and compliant structure 520 may be monolithic. That is, support structure 510 and compliant structure 520 may comprise the same material and may be formed from a single piece of material such that there are no physical splits in material between them.

Compliant structure 520 being integral and/or monolithic with seal carrier 530 and/or support structure 510 may allow a more precise tuning of compliant structure 520 to apply a desired force to seal 340 to create a seal between seal 340 and seal plate 350. With more precise tuning of compliant structure 520, a more precise and desirable pressure and coning of seal 340 against seal plate 350 may be achieved to counteract axial and/or radial translations of bearing ring 210, rotational member 220, and/or seal plate 350. A more precise axial force by compliant structure 520 may improve the wear rate of seal 340 relative to traditional seal assemblies because seal 340 may only be pressed against seal plate 350 as much as necessary.

Compliant structure 520 being integral with seal carrier 530 and/or support structure 510 may allow a more precise tuning of compliant structure 520 to apply a desired force to seal 340 to create a seal between seal 340 and seal plate 350. With more precise tuning of compliant structure 520, a more precise and desirable pressure and coning of seal 340 against seal plate 350 may be achieved to counteract axial and/or radial translations of bearing ring 210, rotational member 220, and/or seal plate 350. A more precise axial force by compliant structure 520 may improve the wear rate of seal 340 relative to traditional seal assemblies because seal 340 may only be pressed against seal plate 350 as much as necessary.

In various embodiments, first support arm 512 of support structure 510 may be coupled to a structure 450 within the gas turbine engine. First support arm 512 may be coupled to structure 450 in any suitable manner, such as by a bolt 460. Second support arm 514 may be most radially inward portion (closest to axis of rotation 120 depicted in FIG. 1) of support structure 510. In various embodiments, second support arm 514 may be coupled to a knife edge seal 345. Knife edge seal 345 may be stationary during gas turbine engine operation, and may be in contact with knife edges 360, which rotate about axis of rotation 120 (depicted in FIG. 1) during gas turbine engine operation. Knife edge seal 345 may provide a seal against knife edges 360 such that no fluid may pass between knife edge seal 345 and knife edges 360.

In various embodiments, seal carrier 530, compliant structure 520, and/or support structure 510 may be integral and/or monolithic. That is seal carrier 530, compliant structure 520, and/or support structure 510 may be formed so that there are no physical splits in material between them, and/or may comprise the same material. In various embodiments, seal carrier 530, compliant structure 520, and/or support structure 510 may comprise a steel alloy, a titanium alloy, and/or any other suitable material. In various embodiments the titanium alloy may be Titanium 6Al-4V. In various embodiments, seal carrier 530, compliant structure 520, and/or support structure 510 each may be comprised of any suitable material, which may be different materials, but still may be integral with one another. That is, though seal carrier 530, compliant structure 520, and/or support structure 510 may be comprised of different materials, there may be no physical splits between seal carrier 530, compliant structure 520, and/or support structure 510. For example, seal carrier 530 and/or support structure 510 may comprise a titanium alloy, such Titanium 6Al-4V, and compliant structure 520 may comprise a steel alloy. In various embodiments, seal carrier 530, compliant structure 520, and/or support structure 510 may each comprise a titanium alloy, which may be different titanium alloys between seal carrier 530, compliant structure 520, and/or support structure 510.

With seal carrier 530 and/or support structure 510 being integral and/or monolithic with compliant structure 520, seal assembly 500 and/or bearing compartment 430 may comprise fewer leak paths, through which fluid within the bearing compartment may escape, than traditional bearing compartment and/or seal assembly designs. Fewer leak paths in the bearing compartment may result in fewer safety risks associated with potential fluid leaks and better gas turbine engine operation and efficiency. Additionally, seal carrier 530, compliant structure 520, and/or support structure 510 being integral and/or monolithic may reduce manufacturing and assembly costs because seal assembly 500 comprises less separate components than traditional seal assemblies.

Referring to FIG. 4, in various embodiments, bearing compartment 630 may comprise bearing assembly 600 and/or seal assembly 700. Elements with the like element numbering as depicted in FIGS. 2 and 3, are intended to be the same and will not be repeated for the sake of clarity. Seal assembly 700 may be configured to prevent fluid leakage from bearing compartment 630. Seal assembly 700 may comprise a support structure 710, a compliant structure 720, a seal carrier 730, a seal 340, and/or a seal plate 350. Seal 340 and/or nose 343 may contact seal plate 350 during gas turbine engine operation such that no fluid within bearing compartment 630 may leak between seal 340 and seal plate 350.

In various embodiments, seal carrier 730 may be coupled to seal 340. Seal carrier 730 may comprise a first carrier contact surface 732 and/or a second carrier contact surface 734 proximate to a carrier first end 731. First carrier contact surface 732 and/or second carrier contact surface 734 may form a seal pocket 735. Seal 340 may be disposed in seal pocket 735 and/or coupled to first carrier contact surface 732 and/or second carrier contact surface 734. A carrier second end 737 of seal carrier 730 may be coupled to compliant structure 720. In various embodiments, seal carrier 730 and compliant structure 720 may be integral. That is, seal carrier 730 and compliant structure 720 may be formed so that there are no physical splits in material between them. In various embodiments, seal carrier 730 and compliant structure 720 may be monolithic. That is, seal carrier 730 and compliant structure 720 may comprise the same material and may be formed from a single piece of material such that there are no physical splits in material between them.

In various embodiments, compliant structure 720 may be disposed axially aft of seal 340 and seal carrier 730. Compliant structure 720 may comprise first end 722 and second end 724. First end 722 may be coupled to carrier second end 737. In various embodiments, compliant structure 720 may comprise a (upside down) V-shape.

Compliant structure 720 may comprise one or more flexible members 721 that are biased in direction 267 and apply the mechanical load to seal carrier 730. The mechanical load applied by compliant structure 720 on seal carrier 730 may cause seal 340 to stay in contact with seal plate 350 such that a seal is formed to resist fluid leakage from bearing compartment 630.

During gas turbine engine operation, because of the moving components within the engine and conditions under which the engine may operate, bearing ring 210, rotational member 220, and/or seal plate 350 may translate axially, that is, parallel to and/or along axis 265, or radially. In response to bearing ring 210, rotational member 220, and/or seal plate 350 translating axially or radially, seal 340 may translate axially or radially, and as a result, seal carrier 730 may translate axially or radially. Such translations may take place in direction 266 and/or direction 267, or in a radial direction. Compliant structure 720 may be biased in a direction opposite of direction 266, such as direction 267. The bias of compliant structure 720 may apply a load to seal carrier 730 and/or seal 340 in direction 267 such that seal 340 tends to stay in contact with seal plate 350 during such translations such that a seal is formed, which resists fluid leakage from bearing compartment 630. The bias of compliant structure 720 applying a mechanical load in direction 267 counteracts translations by bearing ring 210, rotational member 220, and/or seal plate 350, so that the mechanical load is continually applied to seal 340 to keep seal 340 in contact with seal plate 350. For example, in response to bearing ring 210, rotational member 220, and/or seal plate 350 translating in direction 267, compliant structure 720 may relax to counteract the translation while continuing to apply force against seal 340 and seal plate 350 to maintain the seal between the two components. As a further example, in response to bearing ring 210, rotational member 220, and/or seal plate 350 translating in direction 266, compliant structure 720 may compress to counteract the translation while continuing to apply force against seal 340 and seal plate 350 to maintain the seal between the two components.

In various embodiments, the force or mechanical load applied by compliant structure 720 to counteract translations by bearing ring 210, rotational member 220, and/or seal plate 350 during gas turbine engine operation may be non-linear in magnitude, and generally in direction 267. Compliant structure 720 may be biased to apply the non-linear force to counteract such translations by the other components so as to keep seal 340 in contact with seal plate 350.

In various embodiments, second end 724 of compliant structure 720 may be coupled to support structure 710. Compliant structure 720 may be disposed axially between seal carrier 730 and support structure 710. Support structure 710 may comprise a first support arm 712 and/or a second support arm 714, which may converge at a support intersection 715. Second end 724 of compliant structure 720 may couple to support structure 710 at second support arm 714 or proximate to second support arm 714. In various embodiments, second end 724 of compliant structure 720 may couple to support structure 710 at any suitable location on support structure 710. In various embodiments, compliant structure 720 and support structure 710 may be integral. That is, support structure 710 and compliant structure 720 may be formed so that there are no physical splits in material between them. In various embodiments, support structure 710 and compliant structure 720 may be monolithic. That is, support structure 710 and compliant structure 720 may comprise the same material and may be formed from a single piece of material such that there are no physical splits in material between them.

Compliant structure 720 being integral and/or monolithic with seal carrier 730 and/or support structure 710 may allow a more precise tuning of compliant structure 720 to apply a desired force to seal 340 to create a seal between seal 340 and seal plate 350. With more precise tuning of compliant structure 720, a more precise and desirable pressure and coning of seal 340 against seal plate 350 may be achieved to counteract axial and/or radial translations of bearing ring 210, rotational member 220, and/or seal plate 350. A more precise axial force by compliant structure 720 may improve the wear rate of seal 340 relative to traditional seal assemblies because seal 340 may only be pressed against seal plate 350 as much as necessary.

In various embodiments, first support arm 712 of support structure 710 may be coupled to a structure 450 within the gas turbine engine. First support arm 712 may be coupled to structure 450 in any suitable manner, such as by a bolt 460. Second support arm 714 may be most radially inward portion (closest to axis of rotation 120 depicted in FIG. 1) of support structure 710. In various embodiments, second support arm 714 may be coupled to a knife edge seal 345. Knife edge seal 345 may be stationary during gas turbine engine operation, and may be in contact with knife edges 360, which rotate about axis of rotation 120 (depicted in FIG. 1) during gas turbine engine operation. Knife edge seal 345 may provide a seal against knife edges 360 such that no fluid may pass between knife edge seal 345 and knife edges 360.

In various embodiments, seal carrier 730, compliant structure 720, and/or support structure 710 may be integral and/or monolithic. That is seal carrier 730, compliant structure 720, and/or support structure 710 may be formed so that there are no physical splits in material between them, and/or may comprise the same material. In various embodiments, seal carrier 730, compliant structure 720, and/or support structure 710 may comprise a steel alloy, a titanium alloy, and/or any other suitable material. In various embodiments the titanium alloy may be Titanium 6Al-4V. In various embodiments, seal carrier 730, compliant structure 720, and/or support structure 710 each may be comprised of any suitable material, which may be different materials, but still may be integral with one another. That is, though seal carrier 730, compliant structure 720, and/or support structure 710 may be comprised of different materials, there may be no physical splits between seal carrier 730, compliant structure 720, and/or support structure 710. For example, seal carrier 730 and/or support structure 710 may comprise a titanium alloy, such Titanium 6Al-4V, and compliant structure 720 may comprise a steel alloy. In various embodiments, seal carrier 730, compliant structure 720, and/or support structure 710 may each comprise a titanium alloy, which may be different titanium alloys between seal carrier 730, compliant structure 720, and/or support structure 710.

With seal carrier 730 and/or support structure 710 being integral and/or monolithic with compliant structure 720, seal assembly 700 and/or bearing compartment 630 may comprise fewer leak paths, through which fluid within bearing compartment 630 may escape, than traditional bearing compartment and/or seal assembly designs. Fewer leak paths in the bearing compartment may result in fewer safety risks associated with potential fluid leaks and better gas turbine engine operation and efficiency. Additionally, seal carrier 730, compliant structure 720, and/or support structure 710 being integral and/or monolithic may reduce manufacturing and assembly costs because seal assembly 700 comprises less separate components than traditional seal assemblies.

With seal carrier 730 and/or support structure 710 being integral with compliant structure 720, seal assembly 700 and/or bearing compartment 630 may comprise fewer leak paths, through which fluid within bearing compartment 630 may escape, than traditional bearing compartment and/or seal assembly designs. Fewer leak paths in the bearing compartment may result in fewer safety risks associated with potential fluid leaks and better gas turbine engine operation and efficiency. Additionally, seal carrier 730, compliant structure 720, and/or support structure 710 being integral may reduce manufacturing and assembly costs because seal assembly 700 comprises less separate components than traditional seal assemblies.

Overall, with reference to FIGS. 2-4, the compliant structure, such as compliant structures 320, 520, and/or 720, in a seal assembly, such as such as seal assembly 300, 500, and/or 700, respectively, may be any structure comprising at least one flexible member (such as flexible members 321, 521, and/or 721) configured to apply a force or mechanical load to the seal carrier, such as seal carrier 330, 530, and/or 730, and/or seal 340 to keep seal 340 in contact with seal plate 350 during gas turbine engine operation.

In various embodiments, with further reference to FIGS. 2-4, the compliant structure may be integral and/or monolithic with the seal carrier, such as seal carrier 330, 530, and/or 703, and/or the support structure, such as support structure 310, 510, and/or 710, and therefore, the integral and/or monolithic piece comprising the seal carrier, compliant structure, and/or support structure may be constructed by additive manufacturing, such as direct metal laser sintering or electron beam melting. Through additive manufacturing, material may be continuously and/or repeatedly added to form the integral and/or monolithic piece comprising the seal carrier, compliant structure, and/or support structure. As described herein, the seal carrier, compliant structure, and/or support structure may be comprised of the same or different materials, but may still be integral with one another. This multi-material, integral structure comprised of the seal carrier, compliant structure, and/or support structure may be possible by implementing additive manufacturing, during which, for example, one material is used to create the mass comprised in the seal carrier, another material is used to create the mass comprised in the compliant structure, and another material is used to create the mass of material comprised in the support structure. During manufacturing, the seal carrier, compliant structure, and support structure may be formed in any suitable order.

While this disclosure is described in terms of a seal assembly in a bearing compartment in a gas turbine engine, it would not be outside the scope of this disclosure to apply the bearing compartments, bearing assemblies, and/or seal assemblies described herein to any suitable system or apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal assembly, comprising:
   a seal carrier;
   a seal coupled to the seal carrier;
   a compliant structure comprising a first end and a second end, wherein the first end is coupled to the seal carrier, wherein the compliant structure is biased in an axial direction; and
   a support structure coupled to the second end;
   wherein the compliant structure is monolithic with at least one of the seal carrier or the support structure;
   wherein the compliant structure is disposed radially outward of the seal; and
   wherein a portion of the seal carrier is disposed radially between the compliant structure and the seal.

2. The seal assembly of claim 1, wherein the compliant structure is monolithic with the seal carrier and the support structure.

3. The seal assembly of claim 2, wherein the seal carrier, the compliant structure, and the support structure comprise a steel alloy.

4. The seal assembly of claim 2, wherein the seal carrier, the compliant structure, and the support structure comprise a titanium alloy.

5. The seal assembly of claim 1, wherein the compliant structure comprises a flexible member.

6. The seal assembly of claim 5, wherein the compliant structure is a bellows spring.

7. The seal assembly of claim 1, wherein a knife edge seal is coupled to a support arm of the support structure.

8. The seal assembly of claim 1, wherein the seal carrier comprises a first carrier contact surface and a second carrier contact surface that form a seal pocket, wherein the seal is disposed in the seal pocket, wherein seal pocket is radially inward of the compliant structure.

9. The seal assembly of claim 8, further comprising a seal plate disposed adjacent to a nose of the seal, wherein the compliant structure applies a mechanical load to the seal to press the seal against the seal plate.

10. The seal assembly of claim 8, wherein the seal comprises carbon.

11. A bearing compartment, comprising:
    a bearing assembly comprising a bearing ring and a rotational member coupled to the bearing ring; and
    a seal assembly, comprising:
      a seal carrier;
      a seal coupled to the seal carrier;
      a compliant structure comprising a first end and a second end, wherein the first end is coupled to the seal carrier, wherein the compliant structure is biased in an axial direction; and
      a support structure coupled to the second end;
      wherein at least one of the seal carrier or the support structure is monolithic with the compliant structure;
      wherein the compliant structure is disposed radially outward of the seal; and
      wherein a portion of the seal carrier is disposed radially between the compliant structure and the seal.

12. The seal assembly of claim 11, wherein the seal carrier and the support structure are monolithic with the compliant structure.

13. The seal assembly of claim 12, wherein the seal carrier, the compliant structure, and the support structure comprise a steel alloy.

14. The seal assembly of claim 12, wherein the seal carrier, the compliant structure, and the support structure comprise a titanium alloy.

15. The seal assembly of claim 11, wherein the compliant structure is a bellows spring.

16. A gas turbine engine, comprising:
    a bearing compartment comprising:
      a bearing assembly comprising a bearing ring and a rotational member coupled to the bearing ring; and
      a seal assembly, comprising:
        a seal plate coupled to the bearing ring;
        a seal disposed adjacent to the seal plate;
        a seal carrier coupled to the seal;
        a compliant structure coupled to the seal carrier, wherein the compliant structure is biased in an axial direction; and
        a support structure coupled to the compliant structure;

wherein at least one of the seal carrier or the support structure is monolithic with the compliant structure wherein the compliant structure is disposed radially outward of the seal; and wherein a portion of the seal carrier is disposed radially between the compliant structure and the seal.

17. The gas turbine engine of claim 16, wherein the seal carrier and the support structure are monolithic with the compliant structure.

18. The gas turbine engine of claim 16, wherein the compliant structure comprises a flexible member.

19. The gas turbine engine of claim 18, wherein the compliant structure is a bellows spring.

* * * * *